United States Patent [19]
De Winter

[11] 4,318,478
[45] Mar. 9, 1982

[54] UTENSIL ASSEMBLY

[75] Inventor: Koen De Winter, Pierrefonds, Canada

[73] Assignee: COPCO, Inc., Secaucus, N.J.

[21] Appl. No.: 164,502

[22] Filed: Jul. 2, 1980

[51] Int. Cl.$^3$ .................. B65D 5/50; B65D 85/20; A47F 7/00; E21B 19/14
[52] U.S. Cl. .................. 206/553; 206/373; 211/60 R; 220/19
[58] Field of Search .............. 206/373, 374, 375, 372, 206/44 R, 553; 211/60 R; 220/19

[56] References Cited

U.S. PATENT DOCUMENTS

| | | | |
|---|---|---|---|
| 2,193,727 | 3/1940 | Jouffray | 211/60 R |
| 2,815,863 | 12/1957 | Larson | 211/60 R |
| 3,050,073 | 8/1962 | McMillan | 220/19 |
| 3,175,694 | 3/1965 | Reibold et al. | 211/60 R |
| 3,268,087 | 8/1966 | Kramer | 211/60 R |
| 3,326,361 | 6/1967 | Zimmerman | 206/44 R |
| 4,140,256 | 2/1979 | King | 206/373 |

Primary Examiner—William T. Dixson, Jr.
Attorney, Agent, or Firm—Michael Ebert

[57] ABSTRACT

A utensil assembly constituted by a set of utensils having long handles and differently-shaped implement components for handling or processing food, the utensils being supported at separated upright positions in a rack functioning as an organizer and a carrier for the set. The rack is formed by a rectangular pedestal plate having upturned ends to which a gridwork is secured. The gridwork is defined by a lattice bent into a tube having a rectangular cross section whose lower zone is defined by the adjacent ends of the lattice and is bridged across the upturned ends of the plate at the upper edges thereof. The network of cells created by the parallel upper and lower zones of the gridwork act as receptacles for receiving the handles of the utensils, each handle passing through a respective cell in the upper zone and a cell in the lower zone to rest on the pedestal plate whereby each utensil is supported at a distinct position at which it may be readily selected and removed from the rack.

5 Claims, 4 Drawing Figures

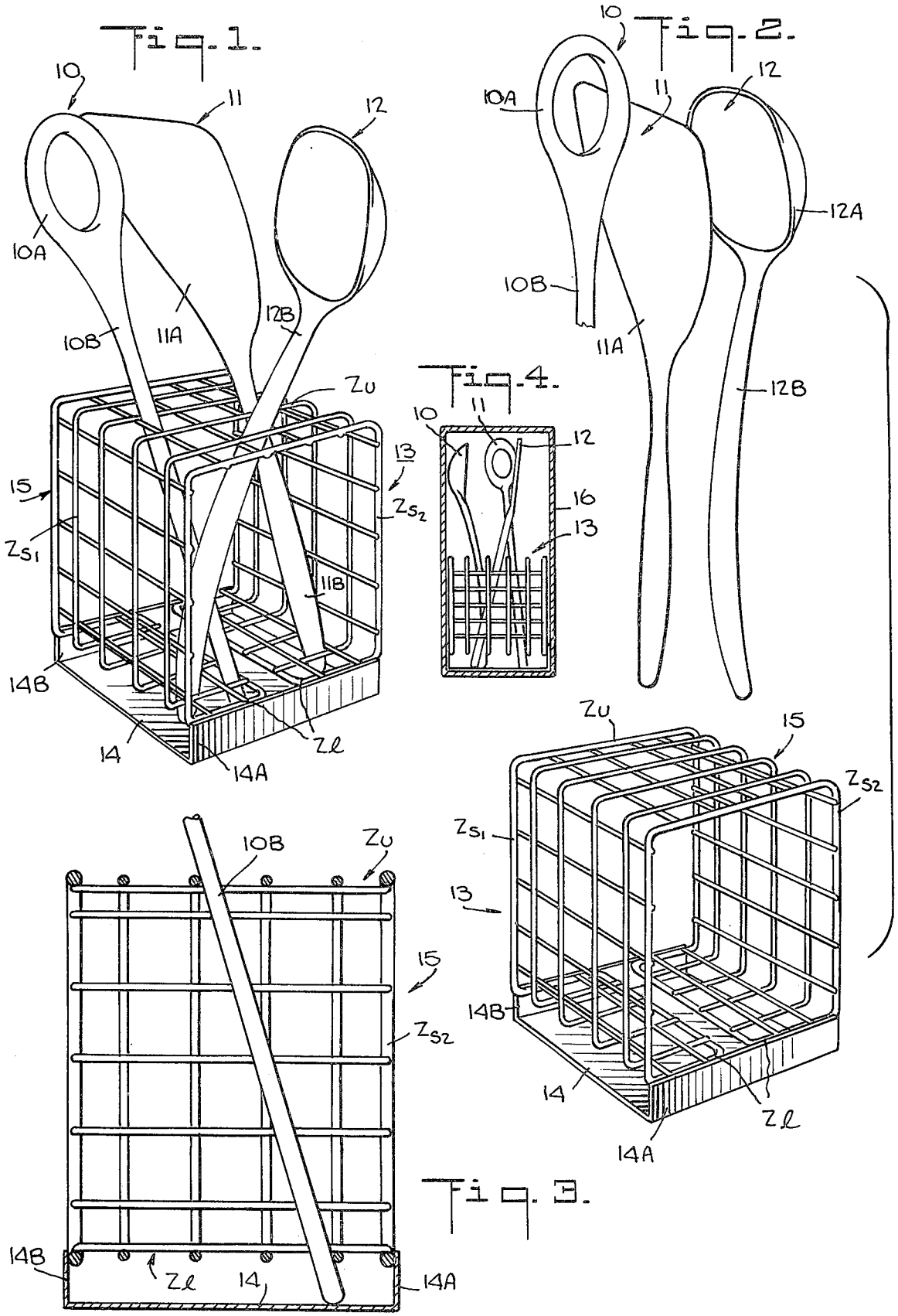

UTENSIL ASSEMBLY

BACKGROUND OF THE INVENTION

This invention relates generally to food handling utensils, and more particularly to a utensil assembly constituted by a set of utensils supported at separated upright positions in a storage rack acting as an organizer and as a carrier for the set.

A modern, well-equipped kitchen requires a variety of different utensils to facilitate cooking and food handling procedures. Among these utensils are a ladle, a deep-bowled spoon having a long handle for dipping up and conveying liquids such as soup, and a slotted spoon that is similar to a ladle but with a slotted bowl making it possible to pick up food immersed in liquid while draining the liquid therefrom.

Also in use for food handling are a spatula having a flat, thin blade attached to a long handle for lifting up spread-out food, a long fork adapted to pierce pieces of food to be picked up, as well as stirrers, turners and other implements for handling or processing food.

The range of differently-shaped utensils required in the modern kitchen gives rise to certain practical problems. If, for example, the utensils are kept in kitchen drawers or cabinets, they are not readily accessible to the working chef, particularly if the utensils are stored at scattered locations. On the other hand, if the utensils are loosely piled on a counter adjacent the cooking facility, they present a disorganized appearance, and the chef must sift through the pile to find the appropriate utensil.

The merchandising of such utensils creates still another problem, for the utensils are generally sold in sets. Since the utensils in a set have diverse shapes, should they be put loosely in a shipping carton large enough to accommodate all of them, the utensils will then tend to rattle in the box when the box is transported. And if the utensils have a fine finish, this finish may be married if the loose utensils in the set are permitted to rub against each other in the carton.

SUMMARY OF INVENTION

In view of the foregoing, the main object of this invention is to provide a utensil assembly constituted by a set of different utensils all having long handles which are supported at separated upright positions in a storage stand or rack acting as an organizer and as a carrier for the set.

More particularly, an object of this invention is to provide an assembly of the above-type in which the rack has a cuboid formation making it possible to fit the rack snugly in the base of a carton having substantially the same cross-sectional form and a height sufficient to accommodate the utensils supported in the rack, whereby the assembly may be compactly packaged and shipped.

Also an object of this invention is to provide an assembly of the above-type in which the utensils in the set are clustered in the rack and yet assume distinct positions, facilitating ready selection of the utensils by the user.

Yet another object of the invention is to provide a utensil assembly which may be mass-produced at low cost, the assembly having simple functional lines and an attractive appearance appropriate to a modern kitchen.

Briefly stated, these objects are accomplished in a utensil assembly in accordance with the invention constituted by a set of utensils having long handles and differently-shaped implements for handling or processing food, the utensils in the set being supported at separated upright positions in a rack having a cuboid configuration and functioning as an organizer and a carrier for the set.

The rack is composed of a rectangular pedestal plate having upturned ends to which a gridwork is welded or otherwise secured. The gridwork is defined by a lattice bent into a tube having a rectangular cross section whose lower zone, which is formed by the adjacent ends of the lattice, is bridged across the upturned ends of the plate at the upper edges thereof.

The network of cells created by the parallel upper and lower zone of the gridwork acts as receptacles for receiving the handles of the utensils. Each handle passes through a respective cell in the upper zone and a cell in the lower zone to rest on the pedestal plate. The blades, bowls, or other implement components of these utensils are disposed at exposed positions above the rack, whereby each utensil is supported at a distinct position from which it may be readily selected and removed from the rack.

OUTLINE OF DRAWINGS

For a better understanding of the invention as well as other objects and further features thereof, reference is made to the following detailed description to be read in conjunction with the accompanying drawings, wherein:

FIG. 1 is a perspective view of an assembly in accordance with the invention constituted by a set of utensils and a rack;

FIG. 2 illustrates the utensils raised above the rack to expose the rack structure;

FIG. 3 is a transverse section taken through FIG. 1 to show how one of the utensil handles is socketed within the rack; and FIG. 4 shows how the assembly may be packaged.

DESCRIPTION OF INVENTION

Referring now to the figures, there is illustrated an assembly in accordance with the invention constituted by a set of three utensils, 10, 11 and 12 for processing and handling food, the utensils being supported at separated, almost upright positions in a rack, generally designated by numeral 13. The rack functions as an organizer and as a carrier for the set.

While for reasons of simplicity, only three utensils are shown, rack 13 is obviously capable of storing a set having a larger number of utensils. Utensil 10 is an egg handler whose implement component is in the form of an oval-shaped ring 10A adapted to nest a boiled egg to be lifted out of a cooking pot, this component being integral with a long handle 10B. Utensil 11 is a spatula having a thin blade component 11A integral with a long handle 11B. Utensil 12 is a ladle having a deep bowl component 12A integral with a long handle 12B.

The set may include other utensils such as a fork and a slotted spoon, all having long handles. The utensils in the set have about the same overall length. In practice, the utensils are preferably fabricated of a synthetic plastic material which is resistant to high temperatures and non-reactive with food ingredients. A suitable plastic for this purpose is a butylated melamine resin formed by incorporating butyl and other alcohols during resin formation. Such resins, which are heat cured, are characterized by hardness, wear resistance and resistance to solvents and foods. Because of these characteristics, utensils made of melamine are dish-washer proof and can be cleaned and sterilized as readily as metal utensils.

Rack 13 may be fabricated of the same plastic material as the utensils or of a metal such as steel which is enamel coated. The rack is constituted by a pedestal 14 and a gridwork 15 anchored thereon.

Pedestal 14 is formed by a rectangular plate having upturned ends 14A and 14B at right angles to the base plane of the plate. Gridwork 15 is created by a rectangular lattice composed of crossed wires, the lattice being bent to assume the form of a tube having a rectangular cross section. The tube has a horizontal lower zone $Z_l$ defined by the adjacent ends of the bent lattice. These adjacent ends are bridged across the upper edges of the upturned ends 14A and 14B and are welded or otherwise attached thereto.

The tube further includes a horizontal upper zone $Z_u$ parallel to lower zone $Z_l$ and a pair of vertical side zones $Z_{s1}$ and $Z_{s2}$. The network of cells created by the parallel upper and lower zones of the gridwork acts as receptacles for receiving the handles of the utensils in the set. Each handle, as illustrated by handle 10B in FIG. 3, passes through a selected cell in upper zone $Z_u$ and a cell in lower zone $Z_l$ to rest on pedestal plate 14.

It is not necessary that the utensils stand perfectly upright, for the handles of the set may be inserted into the gridwork casually and without any particular care. Thus in FIG. 3, the handle passes through a cell in the lower zone which is vertically displaced from the cell in the upper cell accommodating the same handle whereby the utensil is then inclined with respect to the vertical.

There are many more cells in the network than there are utensils in the set, for allowance must be made for the fact that the implement components of the utensils are much broader than the handles. However, the rack is large enough to store all of the utensils at separated positions so that the implement components are distinctly visible, and one may choose and withdraw a utensil for use without difficulty.

Because of the cuboid configuration of rack 13, it is possible to compactly package the assembly of a rack and a set of utensils in a corrugated cardboard carton 16 or other form of box. This is shown in FIG. 4 where it will be seen that the carton has substantially the same cross-sectional dimensions as the rack so that the rack fits snugly at the bottom thereof.

The height of carton 16 is slightly greater than the length of the utensils so that the utensils supported within the rack lie within the closed carton. The rack limits movement of the utensils, and all that is necessary to prevent rattling of the utensils is to insert some stuffing into the carton in the space therein above the rack.

While there has been shown and described a preferred embodiment of a utensil assembly in accordance with the invention, it will be appreciated that many changes and modifications may be made therein without, however, departing from the essential spirit thereof.

I claim:

1. A utensil assembly comprising:
   A a set of utensils having long handles and differently-shaped implement components for handling or processing food, the utensils in the set all having substantially the same overall length;
   B a rack for supporting the utensils at separated, substantially upright positions to facilitate the selection of utensils by a user, said rack including a raised gridwork formed by a lattice bent into a tube having a rectangular cross section whose lower zone is formed by the adjacent ends of the lattice and whose upper zone is parallel thereto, said zones creating a network of cells acting as receptacles to receive the handles of the utensils, each of which extends through a respective cell in the upper zone and a cell in the lower zone, and
   C a pedestal to support said rack to provide a space between the lower zone and the ground plane, said pedestal being defined by a rectangular plate having upturned ends, the adjacent ends of the lattice tube bridging said upturned ends and being secured to the upper edges thereof, the free lower ends of the handles resting on said plate, the implement components of the utensils being then disposed well above the upper zone of the gridwork to expose the upper portions of the handles.

2. A utensil assembly as set forth in claim 1, wherein said utensils are all formed of synthetic plastic material which is non-reactive with food.

3. An assembly as set forth in claim 2, wherein said material is malamine.

4. A utensil assembly as set forth in claim 1, wherein said lattice is formed of crossed metal wires which are enamel coated.

5. A packaged utensil assembly constituted by a utensil assembly as set forth in claim 1, and a rectangular carton whose cross section substantially matches that of said rack pedestal whereby said rack is snugly received in the bottom portion thereof, said carton having a height slightly greater than that of said utensils to accommodate the utensils supported in the rack.

* * * * *